(12) United States Patent
Tiwari (10) Patent No.: US 9,936,378 B2
(45) Date of Patent: Apr. 3, 2018

(54) DEVICE AND METHOD OF HANDLING NON ACCESS STRATUM PROCEDURE

(71) Applicant: HTC Corporation, Taoyuan (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/273,719

(22) Filed: Sep. 23, 2016

(65) Prior Publication Data

US 2017/0086064 A1 Mar. 23, 2017

Related U.S. Application Data

(60) Provisional application No. 62/222,745, filed on Sep. 23, 2015.

(51) Int. Cl.
| | | |
|---|---|---|
| *H04W 8/22* | (2009.01) | |
| *H04W 4/00* | (2009.01) | |
| *H04W 76/00* | (2009.01) | |
| *H04W 88/06* | (2009.01) | |
| *H04L 29/12* | (2006.01) | |

(Continued)

(52) U.S. Cl.
CPC ........... *H04W 8/22* (2013.01); *H04L 61/6054* (2013.01); *H04W 4/003* (2013.01); *H04W 76/068* (2013.01); *H04B 1/3816* (2013.01); *H04W 88/06* (2013.01)

(58) Field of Classification Search
CPC ..... H04W 8/22; H04W 4/003; H04W 76/068; H04W 88/06
USPC ... 455/422.1, 426.1, 432.2, 434, 435.2, 443, 455/445, 448, 454, 455, 41.2, 41.3, 552.1, 455/553.1
See application file for complete search history.

(56) References Cited

U.S. PATENT DOCUMENTS

| | | | | |
|---|---|---|---|---|
| 2008/0305792 | A1* | 12/2008 | Khetawat | ............. H04W 88/12 455/435.1 |
| 2013/0155948 | A1* | 6/2013 | Pinheiro | ............... H04W 4/005 370/328 |

(Continued)

OTHER PUBLICATIONS

3GPP TS 31.111 V13.0.0 (Jul. 2015) Technical Specification 3rd Generation Partnership Project; Technical Specification Group Core Network and Terminals; Universal Subscriber Identity Module (USIM) Application Toolkit (USAT) (Release 13).

(Continued)

*Primary Examiner* — Inder Mehra
(74) *Attorney, Agent, or Firm* — Winston Hsu (57) ABSTRACT

A communication device of handling a Non Access Stratum procedure comprises instructions of accessing a first network by using the first IMSI; transmitting a first NAS request message to the first network by using the first IMSI; receiving a NAS response message comprising a timer value and a cause value from the first network; starting a timer for the first IMSI with the timer value; not transmitting a second NAS request message to the first network by using the first IMSI, if the timer is running for the first IMSI; changing from the first IMSI to the second IMSI without removing the USIM; keeping the timer running, after changing to the second IMSI; accessing a second or the first network by using the second IMSI; and transmitting a third NAS request message to the second or the first network by using the second IMSI, when the timer is running.

17 Claims, 5 Drawing Sheets

(51) Int. Cl.
*H04W 76/06* (2009.01)
*H04B 1/3816* (2015.01)

(56) References Cited

U.S. PATENT DOCUMENTS

2015/0282042 A1* 10/2015 Griot .................... H04W 40/04
370/329
2015/0304953 A1* 10/2015 Sun ................... H04W 52/0235
370/311
2017/0171149 A1* 6/2017 Cheng ................ H04L 61/2046

OTHER PUBLICATIONS

3GPP TS 24.301 V13.2.0 (Jun. 2015) Technical Specification 3rd Generation Partnership Project; Technical Specification Group Core Network and Terminals; Non-Access-Stratum (NAS) protocol for Evolved Packet System (EPS); Stage 3 (Release 13).

* cited by examiner

DEVICE AND METHOD OF HANDLING NON ACCESS STRATUM PROCEDURE

CROSS REFERENCE TO RELATED APPLICATIONS

This application claims the benefit of U.S. Provisional Application No. 62/222,745, filed on Sep. 23, 2015, which is incorporated herein by reference.

BACKGROUND OF THE INVENTION

1. Field of the Invention

The present invention relates to a communication device and a method used in a wireless communication system, and more particularly, to a communication device and method of handling a Non Access Stratum procedure in a wireless communication system.

2. Description of the Prior Art

A user equipment (UE) is not allowed to transmit an Evolved Packet System (EPS) session management (SM) (ESM) request message (e.g., "PDN CONNECTIVITY REQUEST" message) by using an international mobile subscriber identity (IMSI) for an access point name (APN) if a timer is running or a Universal Mobile Telecommunications System (UMTS) subscriber identity module (USIM) is removed, when receiving an ESM cause value (e.g., #26: insufficient resources) for the APN. In addition, a UE does not transmit (e.g., initiate) another EPS mobility management (MM) (EMM) request message by using an IMSI, when an EMM request message transmitted by the UE by using the IMSI is rejected with an EMM cause value (e.g., #22: congestion). However, the operation to be performed by the UE is unknown, when the IMSI in the USIM is changed via data download, a USAT application or "REFRESH" command.

In addition, a network may transmit a NAS reject message with a cause value (e.g., #7: EPS services not allowed, #11: Public land mobile network (PLMN) not allowed, #12: Tracking area not allowed, #13: Roaming not allowed in this tracking area, #14: EPS services not allowed in this PLMN or #15: No suitable cells in tracking area) to a UE, after receiving a NAS request message transmitted from a UE by using an IMSI. Then, the UE is not allowed to transmit another NAS request message to get services in a cell, a location area, a tracking area or a PLMN where the UE receives the cause value. However, the operation to be performed by the UE when the IMSI in the USIM is changed via data download, a USAT application or "REFRESH" command is unknown, after receiving the NAS reject message with the cause value related to the IMSI.

Thus, how to handle a NAS procedure is an important problem to be solved.

SUMMARY OF THE INVENTION

The present invention therefore provides a method and related communication device for handling a Non Access Stratum procedure to solve the abovementioned problem.

A communication device of handling a Non Access Stratum (NAS) procedure in a wireless communication system, the communication device comprising a Universal Mobile Telecommunications System (UMTS) subscriber identity module (USIM) for storing a first international mobile subscriber identity (IMSI) and a second IMSI comprises a storage unit for storing instructions and a processing circuit coupled to the storage unit. The processing circuit is configured to execute the instructions stored in the storage unit. The instructions comprise accessing a first network of the wireless communication system by using the first IMSI; transmitting a first NAS request message to the first network by using the first IMSI; receiving a NAS response message comprising a timer value and a cause value from the first network, after transmitting the first NAS request message; starting a timer for the first IMSI with the timer value, after receiving the NAS response message; not transmitting a second NAS request message to the first network by using the first IMSI, if the timer is running for the first IMSI; changing from the first IMSI to the second IMSI without removing the USIM; keeping the timer running, after changing to the second IMSI; accessing a second or the first network of the wireless communication system by using the second IMSI; and transmitting a third NAS request message to the second or the first network by using the second IMSI, when the timer is running.

A communication device of handling a Non Access Stratum (NAS) procedure in a wireless communication system, the communication device comprising a Universal Mobile Telecommunications System (UMTS) subscriber identity module (USIM) for storing a first international mobile subscriber identity (IMSI) and a second IMSI comprises a storage unit for storing instructions and a processing circuit coupled to the storage unit. The processing circuit is configured to execute the instructions stored in the storage unit. The instructions comprise accessing a first network of the wireless communication system by using the first IMSI; transmitting a first NAS request message to the first network by using the first IMSI; receiving a NAS response message comprising a timer value and a cause value from the first network, after transmitting the first NAS request message; starting a timer for the first IMSI with the timer value, after receiving the NAS response message; not transmitting a second NAS request message to the first network by using the first IMSI, if the timer is running for the first IMSI; changing from the first IMSI to the second IMSI without removing the USIM; accessing a second or the first network of the wireless communication system by using the second IMSI; and stopping the timer after changing to the second IMSI and transmitting a third NAS request message to the second or the first network by using the second IMSI.

A communication device of handling a Non Access Stratum (NAS) procedure in a wireless communication system, the communication device comprising a Universal Mobile Telecommunications System (UMTS) subscriber identity module (USIM) for storing a first international mobile subscriber identity (IMSI) and a second IMSI comprises a storage unit for storing instructions and a processing circuit coupled to the storage unit. The processing circuit is configured to execute the instructions stored in the storage unit. The instructions comprise accessing a first network of the wireless communication system by using the first IMSI; transmitting a first NAS request message to the first network by using the first IMSI; receiving a NAS response message comprising a cause value from the first network, after transmitting the first NAS request message; not transmitting a second NAS request message to the first network by using the first IMSI, after receiving the NAS response message; changing from the first IMSI to the second IMSI without removing the USIM; accessing a second or the first network of the wireless communication system by using the second IMSI; and transmitting a third NAS request message to the second or the first network by using the second IMSI according to the cause value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
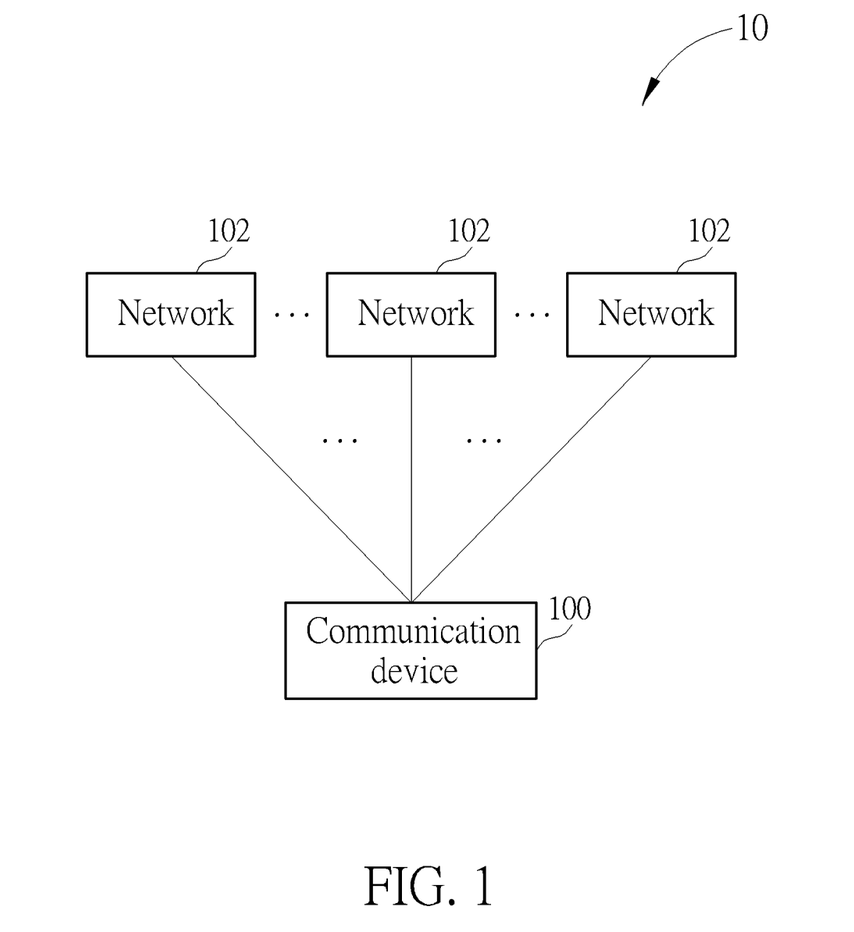
FIG. 1 is a schematic diagram of a wireless communication system according to an example of the present invention.

FIG. 1 is a schematic diagram of a wireless communication system 10 according to an example of the present invention. The wireless communication system 10 comprises a communication device 100 and at least one network 102. A network 102 may be an evolved packet core (EPC) network, a general packet radio service (GPRS) network, a universal mobile telecommunications system (UMTS), a long-term evolution (LTE) system, a LTE-Advanced (LTE-A) system, a universal terrestrial radio access network (UTRAN) comprising at least one NodeB (NB), an evolved-UTRAN (E-UTRAN) comprising at least one evolved NB (eNB) or a fifth generation (5G) network. The network 102 may manage a packet data networks (PDN) connectivity of the communication device 100 according to a Non Access Stratum (NAS) protocol. In detail, a communication device 100 may transmit a NAS request message to the network 102 to establish a PDN connection with the network 102 for a service, e.g., PDN connectivity/disconnectivity request, evolved packet system (EPS) bearer context activation/deactivation, etc. The network 102 determines whether to accept or reject the NAS request message according a criterion, such as load of the network 102. The communication device 100 is allowed to access the service only if the network 102 accepts the NAS request message. Otherwise, the communication device 100 receives a response with a back-off timer for indicating a rejection of the NAS request message. The communication device 100 can retransmit the NAS request message to set up another PDN connection for the service, after the back-off timer expires, i.e., stops running.

The communication device 100 may be a user equipment (UE), a mobile phone, a laptop, a tablet computer, an electronic book, a portable computer system, a vehicle or aircraft.

Figure 2:
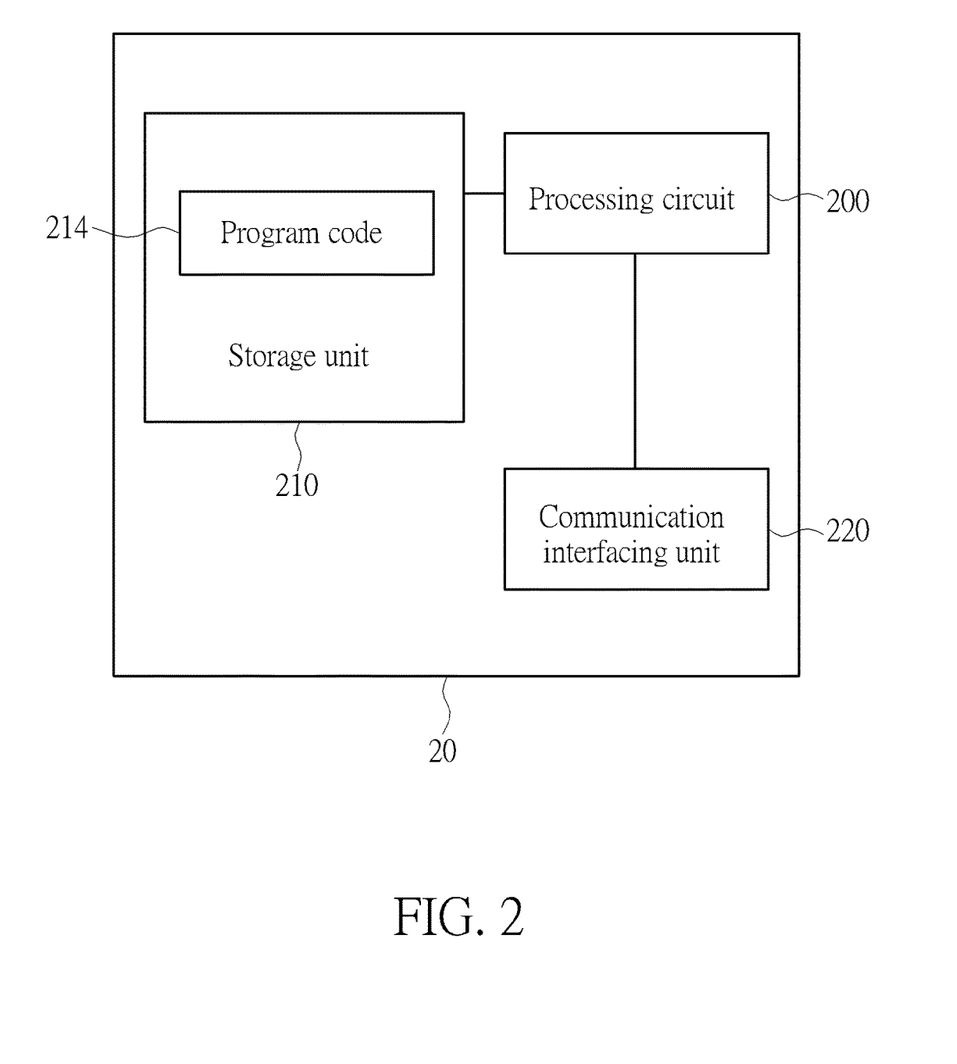
FIG. 2 is a schematic diagram of a communication device according to an example of the present invention.

FIG. 2 is a schematic diagram of a communication device 20 according to an example of the present invention. The communication device 20 may be the communication device 100 or the network 102 shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent the communication device 100 in FIG. 1, and a first network and a second network may be the network 102 in FIG. 1.

Figure 3:
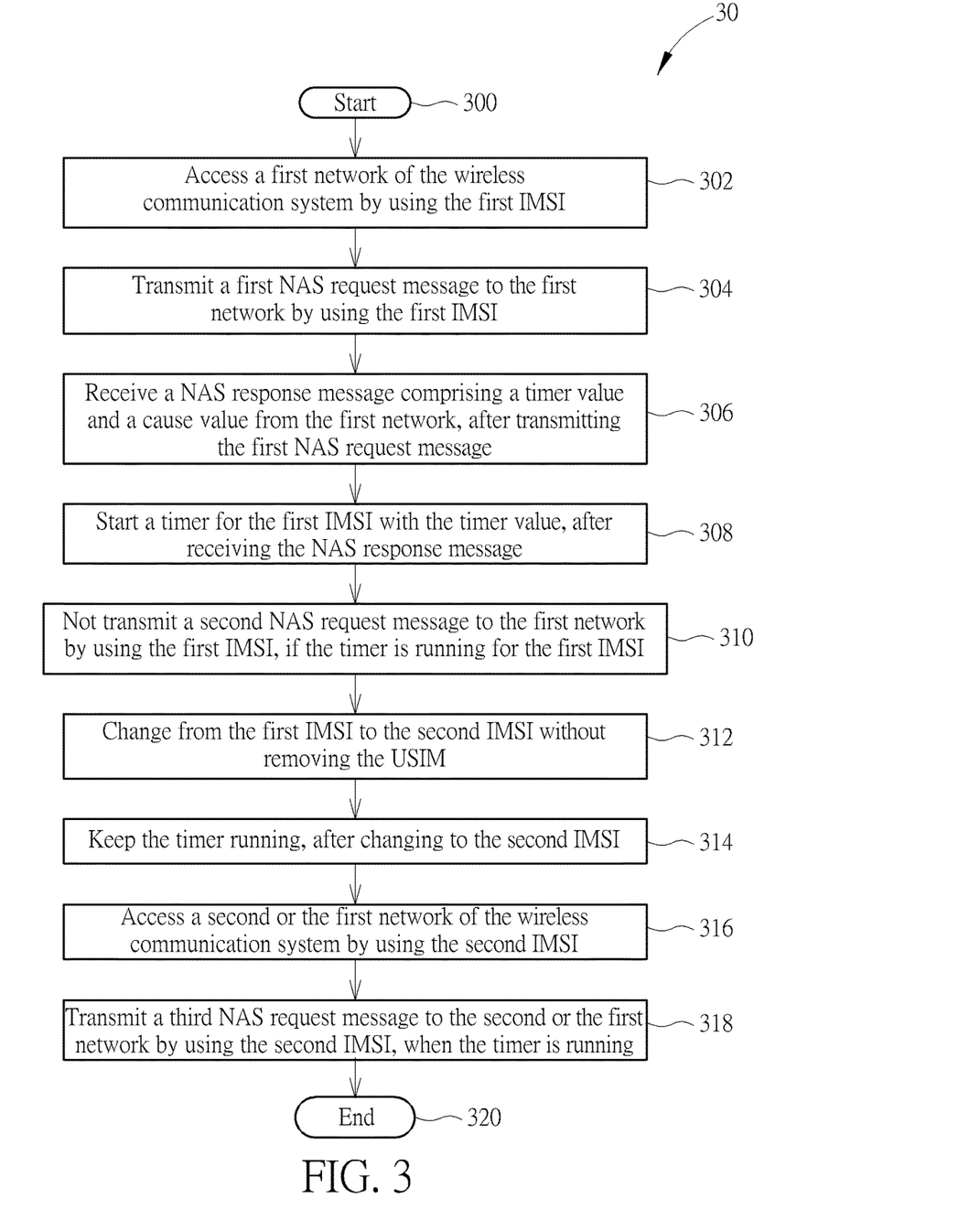
FIG. 3 is a flowchart of a process according to an example of the present invention.

FIG. 3 is a flowchart of a process 30 according to an example of the present invention. The process 30 may be utilized in a UE comprising a UMTS subscriber identity module (USIM) for storing a first international mobile subscriber identity (IMSI) and a second IMSI, to handle a NAS procedure in a wireless communication system. The process 30 includes the following steps:

Step 300: Start.

Step 302: Access a first network of the wireless communication system by using the first IMSI.

Step 304: Transmit a first NAS request message to the first network by using the first IMSI.

Step 306: Receive a NAS response message comprising a timer value and a cause value from the first network, after transmitting the first NAS request message.

Step 308: Start a timer for the first IMSI with the timer value, after receiving the NAS response message.

Step 310: Not transmit a second NAS request message to the first network by using the first IMSI, if the timer is running for the first IMSI.

Step 312: Change from the first IMSI to the second IMSI without removing the USIM.

Step 314: Keep the timer running, after changing to the second IMSI.

Step 316: Access a second or the first network of the wireless communication system by using the second IMSI.

Step 318: Transmit a third NAS request message to the second or the first network by using the second IMSI, when the timer is running.

Step 320: End.

According to the process 30, the UE may access a first network of the wireless communication system by using the first IMSI, and may transmit a first NAS request message to the first network by using the first IMSI. Then, the UE may receive a NAS response message including a timer value and a cause value from the first network, after (e.g., in response to) transmitting the first NAS request message. Further, the UE may start a timer for the first IMSI with the timer value, after (e.g., in response to) receiving the NAS response message. The UE may not transmit a second NAS request message to the first network by using the first IMSI, if the timer is running for the first IMSI. Further, the UE may change from the first IMSI to the second IMSI without removing the USIM, and may keep the timer running after (e.g., in response to) changing to the second IMSI. The UE may access a second or the first network of the wireless communication system by using the second IMSI, and may transmit a third NAS request message to the second or the first network by using the second IMSI when the timer is running. That is, the UE keeps the timer running and transmits the third NAS request message by using the second IMSI, after the first IMSI is changed to the second IMSI. In addition, the timer is associated with the first IMSI.

The UE is not allowed to transmit the first NAS message by using the first IMSI if the timer is still running, after changing back from the second IMSI to the first IMSI. Thus, the UE is able to handle the NAS procedure, when the first IMSI is changed. As a result, the problem of the NAS procedure is solved.

It should be noted that, the term of "using the first/second IMSI" in the process 30 refers that the first/second network recognizes that the UE accesses the first/second network with a subscription identified by the first/second IMSI or a temporary identity of the firs/second IMSI.

Realization of the process 30 is not limited to the above description.

In on example, the first network and the second network may be the same network or different networks. In on example, the first NAS request message or the second NAS request message may include the first IMSI or a temporary identity of the first IMSI or may be a NAS request message of the first IMSI. The third NAS request message may include the second IMSI or a temporary identity of the second IMSI, or may be a NAS request message of the second IMSI. It should be noted that, the NAS request message of the first/second IMSI refers to the NAS request message transmitted for the NAS procedure related to the first/second IMSI, rather than the NAS request message including the first/second IMSI or the temporary identity of the first/second IMSI. For example, the NAS request message may be an "EXTENDED SERVICE REQUEST" message defined in the 3rd Generation Partnership Project (3GPP) standard. In one example, the temporary identity of the first/second IMSI may be a temporary mobile subscriber identity (TMST), a packet-TMST (PMSI) or a globally unique temporary Identity (GUTI) of the UE.

In one example, the first NAS request message, the NAS response message, the second NAS request message or the third NAS request message may be a mobility management (MM) message, an EPS MM (EMM) message or a GPRS MM (GMM) message. In one example, the EMM message or the GMM message may be a location updating request message, location updating reject message, an "ATTACH REQUEST" message, an "ATTACH ACCEPT" message, an "ATTACH REJECT" message, a "TRACKING AREA UPDATE REQUEST" message, a "TRACKING AREA UPDATE ACCEPT" message or a "SERVICE REQUEST" message.

In one example, the first NAS request message, the NAS response message, the second NAS request message or the third NAS request message may be a session management (SM) message or an EPS SM (ESM) message. In one example, the SM or ESM message may be an activate Packet Data Protocol (PDP) context request message, an activate PDP context accept message or an activate PDP context reject message.

In one example, the cause value may be an ESM cause value (e.g., #26: insufficient resources or #27: missing or unknown APN) or EMM cause value (e.g., #22: congestion). In one example, the timer may be an ESM back-off timer (e.g., T3396), an EMM back-off timer (e.g., T3346) or a MM back-off timer (e.g., T3326).

In one example, the first IMSI may be changed to the second IMSI when an Elementary file (e.g., of USIM $EF_{IMSI}$) is changed via data download or a universal SIM application toolkit (USAT) application, and a "REFRESH" command is issued by a universal integrated circuit card (UICC). In one example, the second IMSI may be determined (e.g., selected) by selecting one of application dedicated files (ADFs) of the USIM. Accordingly, the USIM may not be physically removed from the UE. In one example, the UE may perform a UICC reset procedure, a USIM application reset procedure or a 3G session reset procedure.

An example is illustrated according to the process 30 as follows. A UE may initiate an attach procedure by using a first IMSI. That is, the UE may transmit an EMM request message (e.g., "ATTACH REQUEST" message) to a first network by using the first IMSI, i.e., the EMM request message (e.g., "ATTACH REQUEST" message) includes the first IMSI or a temporary identity of the first IMSI. Then, the first network may reject the EMM request message (e.g., "ATTACH REQUEST" message) by transmitting an EMM reject message (e.g., "ATTACH REJECT" message) including an EMM cause value (e.g., #22: congestion) and an EMM back-off timer (e.g., T3346). When receiving the EMM reject message (e.g., "ATTACH REJECT" message) including the EMM cause value (e.g., #22: congestion) and the EMM back-off timer (e.g., T3346) from the first network, the UE may start (e.g., run) the EMM back-off timer (e.g., T3346) for the first IMSI and may not transmit another EMM request message to the first network by using the first IMSI. That is, the UE may not transmit the other EMM request message including the first IMSI or the temporary identity of the first IMSI to the first network, or may not transmit another NAS request message of the first IMSI to the first network. Further, the first IMSI may be changed to a second IMSI via a USAT command. The UE may detach itself from the first network by transmitting a "DETACH REQUEST" message for the first IMSI. The UE may initiate another attach procedure by using the second IMSI. That is, the UE may transmit the other EMM request message (e.g., "ATTACH REQUEST" message) to a second or the first network by using the second IMSI, i.e., the other EMM request message (e.g., "ATTACH REQUEST" message) includes the second IMSI or a temporary identity of the second IMSI (e.g. P-TMSI). The UE may establish an EMM context for the second IMSI, when receiving the "ATTACH ACCEPT" message from the second or the first network. The UE still runs the EMM back-off timer (e.g., T3346) for the first IMSI, and may not transmit the other EMM request message to the first network by using the first IMSI. The first network and the second network may be the same network or different networks.

Another example is illustrated according to the process 30 as follows. A UE may initiate an attach procedure by using a first IMSI, and may have an EMM or GMM context of the first IMSI. That is, the UE may transmit an ESM request message (e.g., "PDN CONNECTIVITY REQUEST" message) to a first network by using the first IMSI for an APN. Then, the first network may reject the ESM request message (e.g., "PDN CONNECTIVITY REQUEST" message) by transmitting an ESM reject message (e.g., "PDN CONNECTIVITY REJECT" message) including an ESM cause value (e.g., #26: insufficient resource) and an ESM back-off timer (e.g., T3396). Accordingly, the UE may not transmit another ESM request message to the first network for the APN until the ESM back-off timer (e.g., T3396) expires. Further, the first IMSI may be changed to a second IMSI via data download or a USAT command. The UE may detach itself from the first network by using the first IMSI, i.e., the UE may remove the EMM or GMM context of the first IMSI. The UE may initiate another attach procedure by using the second IMSI. That is, the UE may establish an EMM or GMM context of the second IMSI. The UE may transmit the other ESM request message (e.g., "PDN CONNECTIVITY REQUEST" message) to a second or the first network by using the second IMSI for the APN rejected by using the first IMSI. The UE may transmit an "ACTIVATE DEFAULT EPS BEARER CONTEXT ACCEPT" message to the second or the first network, when receiving an "ACTIVATE DEFAULT EPS BEARER CONTEXT REQUEST" message from the second or the first network. The UE may establish an EPS context of the second IMSI for the APN. The UE still runs the ESM back-off timer (e.g., T3396) for the first IMSI. The first network and the second network may be the same network or different networks.

Figure 4:
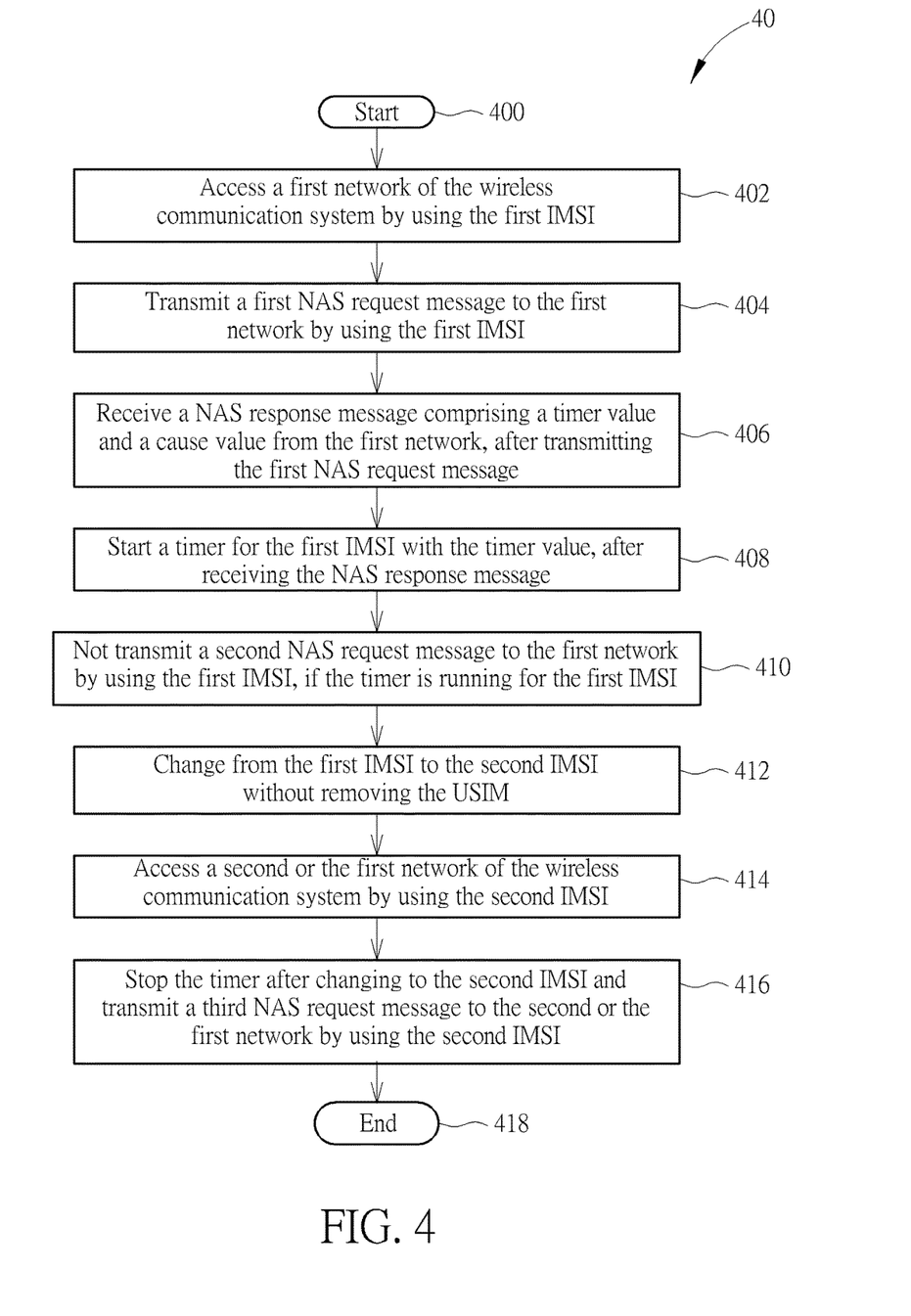
FIG. 4 is a flowchart of a process according to an example of the present invention.

FIG. 4 is a flowchart of a process 40 according to an example of the present invention. The process 40 may be utilized in a UE comprising a USIM for storing a first IMSI and a second IMSI, to handle a NAS procedure in a wireless communication system. The process 40 includes the following steps:

Step 400: Start.

Step 402: Access a first network of the wireless communication system by using the first IMSI.

Step 404: Transmit a first NAS request message to the first network by using the first IMSI.

Step 406: Receive a NAS response message comprising a timer value and a cause value from the first network, after transmitting the first NAS request message.

Step 408: Start a timer for the first IMSI with the timer value, after receiving the NAS response message.

Step 410: Not transmit a second NAS request message to the first network by using the first IMSI, if the timer is running for the first IMSI.

Step 412: Change from the first IMSI to the second IMSI without removing the USIM.

Step 414: Access a second or the first network of the wireless communication system by using the second IMSI.

Step 416: Stop the timer after changing to the second IMSI and transmit a third NAS request message to the second or the first network by using the second IMSI.

Step 418: End.

According to the process 40, the UE may access a first network of the wireless communication system by using the first IMSI, and may transmit a first NAS request message to the first network by using the first IMSI. Then, the UE may receive a NAS response message including a timer value and a cause value from the first network, after (e.g., in response to) transmitting the first NAS request message. Further, the UE may start a timer for the first IMSI with the timer value, after (e.g., in response to) receiving the NAS response message. The UE may not transmit a second NAS request message to the first network by using the first IMSI, if the timer is running for the first IMSI. Further, the UE may change from the first IMSI to the second IMSI without removing the USIM, and may access a second or the first network of the wireless communication system by using the second IMSI. Further, the UE may stop the timer after (e.g., in response to) changing to the second IMSI and may transmit a third NAS request message to the second or the first network by using the second IMSI. That is, the UE stops running the timer and transmits the third NAS request message by using the second IMSI, after the first IMSI is changed to the second IMSI. Thus, the UE is able to handle the NAS procedure, when the first IMSI is changed. As a result, the problem of the NAS procedure is solved.

It should be noted that, the term of "using the first/second IMSI" in the process 40 refers that the first/second network recognizes that the UE accesses the first/second network with a subscription identified by the first/second IMSI or a temporary identity of the firs/second IMSI.

Realization of the process 40 is not limited to the above description.

In on example, the first network and the second network may be the same network or different networks. In on example, the first NAS request message or the second NAS request message may include the first IMSI or a temporary identity of the first IMSI or may be a NAS request message of the first IMSI. The third NAS request message may include the second IMSI or a temporary identity of the second IMSI, or may be a NAS request message of the second IMSI. It should be noted that, the NAS request message of the first/second IMSI refers to the NAS request message transmitted for the NAS procedure related to the first/second IMSI, rather than the NAS request message including the first/second IMSI or the temporary identity of the first/second IMSI. For example, the NAS request message may be an "EXTENDED SERVICE REQUEST" message defined in the 3GPP standard. In one example, the temporary identity of the first/second IMSI may be a TMSI, a PMSI or a GUTI of the UE.

In one example, the first NAS request message, the NAS response message, the second NAS request message or the third NAS request message may be a MM message, an EMM message or a GMM message. In one example, the EMM or GMM message may be a location updating request message, a location updating reject message, an "ATTACH REQUEST" message, an "ATTACH ACCEPT" message, an "ATTACH REJECT" message, a "TRACKING AREA UPDATE REQUEST" message, a "TRACKING AREA UPDATE ACCEPT" message or a "SERVICE REQUEST" message.

In one example, the first NAS request message, the NAS response message, the second NAS request message or the third NAS request message may be a SM message or an ESM message. In one example, the SM or ESM message may be an activate PDP context request message, an activate PDP context accept message or an activate PDP context reject message.

In one example, the cause value may be an ESM cause value (e.g., #26: insufficient resources or #27: missing or unknown APN) or EMM cause value (e.g., #22: congestion). In one example, the timer is an ESM back-off timer (e.g., T3396), an EMM back-off timer (e.g., T3346) or an MM back-off timer (e.g., T3326).

In one example, the first IMSI may be changed to the second IMSI when an Elementary file (e.g., of USIM $EF_{IMSI}$) is changed via data download or a USAT application, and a "REFRESH" command is issued by a UICC. In one example, the second IMSI may be determined (e.g., selected) by selecting one of application dedicated files (ADFs) of the USIM. Accordingly, the USIM may not be physically removed from the UE. In one example, the UE may perform a UICC reset procedure, a USIM application reset procedure or a 3G session reset procedure.

Figure 5:
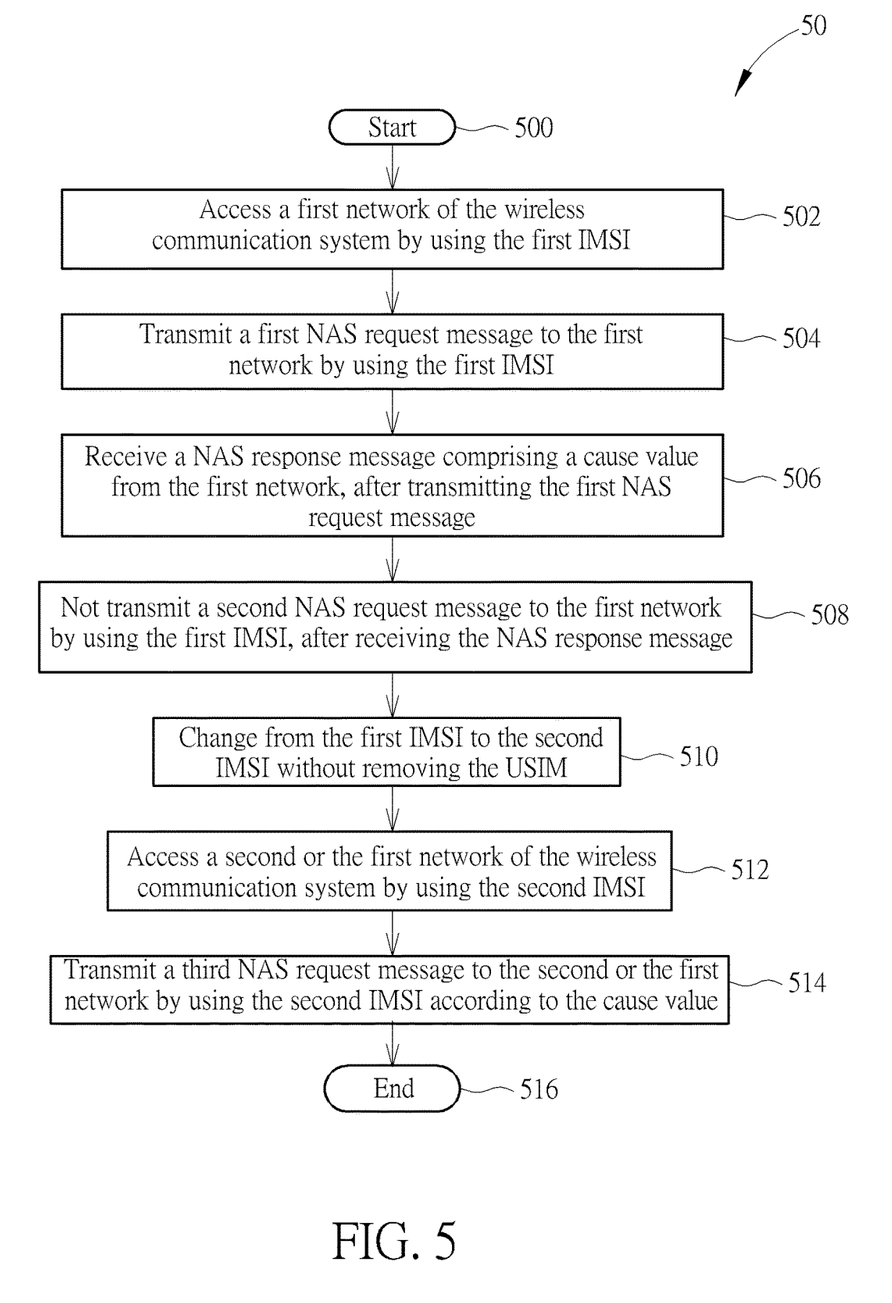
FIG. 5 is a flowchart of a process according to an example of the present invention.

FIG. 5 is a flowchart of a process 50 according to an example of the present invention. The process 50 may be utilized in a UE comprising a USIM for storing a first IMSI and a second IMSI, to handle a NAS procedure in a wireless communication system. The process 50 includes the following steps:

Step 500: Start.

Step 502: Access a first network of the wireless communication system by using the first IMSI.

Step 504: Transmit a first NAS request message to the first network by using the first IMSI.

Step 506: Receive a NAS response message comprising a cause value from the first network, after transmitting the first NAS request message.

Step 508: Not transmit a second NAS request message to the first network by using the first IMSI, after receiving the NAS response message.

Step 510: Change from the first IMSI to the second IMSI without removing the USIM.

Step 512: Access a second or the first network of the wireless communication system by using the second IMSI.

Step 514: Transmit a third NAS request message to the second or the first network by using the second IMSI according to the cause value.

Step 516: End.

According to the process 50, the UE may access a first network of the wireless communication system by using the first IMSI, and may transmit a first NAS request message to the first network by using the first IMSI. Then, the UE may receive a NAS response message including a cause value from the first network, after (e.g., in response to) transmitting the first NAS request message. The UE may not transmit a second NAS request message to the first network by using the first IMSI, after (e.g., in response to) receiving the NAS response message. Further, the UE may change from the first IMSI to the second IMSI without removing the USIM. The UE may access a second or the first network of the wireless communication system by using the second IMSI, and may transmit a third NAS request message to the second or the first network by using the second IMSI according to the cause value. That is, the UE transmits the third NAS request message by using the second IMSI according to the cause value, after the first IMSI is changed to the second IMSI. Thus, the UE is able to handle the NAS procedure, when the first IMSI is changed. As a result, the problem of the NAS procedure is solved.

It should be noted that, the term of "using the first/second IMSI" in the process 50 refers that the first/second network recognizes that the UE accesses the first/second network with a subscription identified by the first/second IMSI or a temporary identity of the firs/second IMSI.

Realization of the process 50 is not limited to the above description.

In on example, the UE may transmit the third NAS request message to a location area or a tracking area where the UE receives the cause value, if the cause value is #12, #13 or #15. In on example, the UE may transmit the third NAS request message to a public land mobile network (PLMN) where the UE receives the cause value, if the cause value is #11. In on example, the UE may determine (e.g., consider) the first IMSI is invalid for at least one GPRS and/or EPS service and may determine (e.g., consider) the second IMSI is valid for the at least one GPRS and/or EPS service, if the cause value is #7. Accordingly, the UE may transmit the third NAS request message by using the second IMSI for the at least one GPRS and/or EPS service, if the cause value is #7. In another example, the UE may enable E-UTRA capability after (e.g., in response to) changing to the second IMSI and may transmit the third NAS request message by using the second IMSI for the at least one GPRS and/or EPS service, if the cause value is #7 or #14 and the UE disables the E-UTRA capability. In on example, the UE may determine (e.g., consider) the first IMSI is invalid for at least one non-GPRS and/or non-EPS service or at least one GPRS and/or EPS service but may determine (e.g., consider) the second IMSI is valid for the at least one non-GPRS and/or non-EPS service or the at least one GPRS and/or EPS service, if the cause value is #8. Accordingly, the UE may transmit the third NAS request message by using the second IMSI for the at least one non-GPRS and/or non-EPS service or the at least one GPRS and/or EPS service, if the cause value is #8.

In on example, the first network and the second network may be the same network or different networks. In on example, the first NAS request message or the second NAS request message may include the first IMSI or a temporary identity of the first IMSI or may be a NAS request message of the first IMSI. The third NAS request message may include the second IMSI or a temporary identity of the second IMSI, or may be a NAS request message of the second IMSI. It should be noted that, the NAS request message of the first/second IMSI refers to the NAS request message transmitted for the NAS procedure related to the first/second IMSI, rather than the NAS request message including the first/second IMSI or the temporary identity of the first/second IMSI. For example, the NAS request message may be an "EXTENDED SERVICE REQ" message defined in the 3GPP standard. In one example, the temporary identity of the first/second IMSI may be a TMSI, a PMSI or a GUTI of the UE.

In one example, the first NAS request message, the NAS response message, the second NAS request message or the third NAS request message may be a MM message, an EMM message or a GMM message. In one example, the EMM or GMM message may be a location updating request message, a location updating reject message, an "ATTACH REQUEST" message, an "ATTACH ACCEPT" message, an "ATTACH REJECT" message, a "TRACKING AREA UPDATE REQUEST" message, a "TRACKING AREA UPDATE ACCEPT" message or a "SERVICE REQUEST" message.

In one example, the first IMSI may be changed to the second IMSI when an Elementary file (e.g., of USIM $EF_{IMSI}$) is changed via data download or a USAT application, and a "REFRESH" command is issued by a UICC. In one example, the second IMSI may be determined (e.g., selected) by selecting one of application dedicated files (ADFs) of the USIM. Accordingly, the USIM may not be physically removed from the UE. In one example, the UE may perform a UICC reset procedure, a USIM application reset procedure or a 3G session reset procedure.

An example is illustrated according to the process 50 as follows. A UE may initiate an attach procedure by using a first IMSI to a first location area of a PLMN. That is, the UE may transmit an "ATTACH REQUEST" message by using the first IMSI to the location area, i.e., the "ATTACH REQUEST" message includes the first IMSI or a temporary identity of the first IMSI. Then, the first location area may reject the "ATTACH REQUEST" message by transmitting a reject message (e.g., "ATTACH REJECT" message) including a cause value (e.g., #15). When receiving the reject message (e.g., "ATTACH REJECT" message) with the cause value (e.g., #15), the UE may not transmit another request message to the first location area by using the first IMSI. Further, the first IMSI may be changed to a second IMSI via a USAT command. The UE may select the PLMN and may transmit another "ATTACH REQUEST" message to a second location area of the PLMN by using the second IMSI, i.e., the other "ATTACH REQUEST" message includes the second IMSI or a temporary identity of the second IMSI (e.g. P-TMSI). The UE may establish an EMM context for the second IMSI, when receiving the "ATTACH ACCEPT" message. The first location area and the second location area may be the same location area or different location areas.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling the NAS procedure. Thus, the UE is able to handle the NAS procedure, when the IMSI is changed. As a result, the problem of the NAS procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a Non Access Stratum (NAS) procedure in a wireless communication system, the communication device comprising a Universal Mobile Telecommunications System (UMTS) subscriber identity module (USIM) for storing a first international mobile subscriber identity (IMSI) and a second IMSI, comprising:
   a storage unit, for storing instructions of:
   accessing a first network of the wireless communication system by using the first IMSI;
   transmitting a first NAS request message to the first network by using the first IMSI;
   receiving a NAS response message comprising a timer value and a cause value from the first network, after transmitting the first NAS request message;
   starting a timer for the first IMSI with the timer value, after receiving the NAS response message;
   not transmitting a second NAS request message to the first network by using the first IMSI, if the timer is running for the first IMSI;
   changing from the first IMSI to the second IMSI without removing the USIM;
   keeping the timer running, after changing to the second IMSI;
   accessing a second or the first network of the wireless communication system by using the second IMSI; and
   transmitting a third NAS request message to the second or the first network by using the second IMSI, when the timer is running;
   wherein the first IMSI is changed to the second IMSI when an Elementary file is changed via data download or a universal SIM application toolkit (USAT) application, and a "REFRESH" command is issued by a universal integrated circuit card (UICC); and
   a processing circuit, coupled to the storage unit, configured to execute the instructions stored in the storage unit.

2. The communication device of claim 1, wherein the first NAS request message or the second NAS request message comprises the first IMSI or a temporary identity of the first IMSI or is a NAS request message of the first IMSI, and the third NAS request message comprises the second IMSI or a temporary identity of the second IMSI or is a NAS request message of the second IMSI.

3. The communication device of claim 1, wherein the first NAS request message, the NAS response message, the second NAS request message or the third NAS request message is a mobility management (MM) message, an Evolved Packet System (EPS) MM (EMM) message or a General Packet Radio Service (GPRS) MM (GMM) message.

4. The communication device of claim 1, wherein the first NAS request message, the NAS response message, the second NAS request message or the third NAS request message is a session management (SM) message or an EPS SM (ESM) message.

5. The communication device of claim 1, wherein the cause value is an EMM cause value or an ESM cause value, and the timer is an ESM back-off timer, an EMM back-off timer or a MM back-off timer.

6. The communication device of claim 1, further comprising:
   performing a UICC reset procedure, a USIM application reset procedure or a third generation (3G) session reset procedure.

7. A communication device of handling a Non Access Stratum (NAS) procedure in a wireless communication system, the communication device comprising a Universal Mobile Telecommunications System (UMTS) subscriber identity module (USIM) for storing a first international mobile subscriber identity (IMSI) and a second IMSI, comprising:
   a storage unit, for storing instructions of:
   accessing a first network of the wireless communication system by using the first IMSI;
   transmitting a first NAS request message to the first network by using the first IMSI;
   receiving a NAS response message comprising a timer value and a cause value from the first network, after transmitting the first NAS request message;
   starting a timer for the first IMSI with the timer value, after receiving the NAS response message;
   not transmitting a second NAS request message to the first network by using the first IMSI, if the timer is running for the first IMSI;
   changing from the first IMSI to the second IMSI without removing the USIM;
   accessing a second or the first network of the wireless communication system by using the second IMSI; and
   stopping the timer after changing to the second IMSI and transmitting a third NAS request message to the second or the first network by using the second IMSI;
   wherein the first IMSI is changed to the second IMSI when an Elementary file is changed via data download or a universal SIM application toolkit (USAT) application, and a "REFRESH" command is issued by a universal integrated circuit card (UICC); and
   a processing circuit, coupled to the storage unit, configured to execute the instructions stored in the storage unit.

8. The communication device of claim 7, wherein the first NAS request message or the second NAS request message comprises the first IMSI or a temporary identity of the first IMSI or is a NAS request message of the first IMSI, and the third NAS request message comprises the second IMSI or a temporary identity of the second IMSI or is a NAS request message of the second IMSI.

9. The communication device of claim 7, wherein the first NAS request message, the NAS response message, the second NAS request message or the third NAS request message is a mobility management (MM) message, an Evolved Packet System (EPS) MM (EMM) message or a General Packet Radio Service (GPRS) MM (GMM) message.

10. The communication device of claim 7, wherein the first NAS request message, the NAS response message, the second NAS request message or the third NAS request message is a session management (SM) message or an EPS SM (ESM) message.

11. The communication device of claim 7, wherein the cause value is an EMM cause value or an ESM cause value, and the timer is an ESM back-off timer, an EMM back-off timer or a MM back-off timer.

12. The communication device of claim 7, further comprising:
performing a UICC reset procedure, a USIM application reset procedure or a third generation (3G) session reset procedure.

13. A communication device of handling a Non Access Stratum (NAS) procedure in a wireless communication system, the communication device comprising a Universal Mobile Telecommunications System (UMTS) subscriber identity module (USIM) for storing a first international mobile subscriber identity (IMSI) and a second IMSI, comprising:
a storage unit, for storing instructions of:
accessing a first network of the wireless communication system by using the first IMSI;
transmitting a first NAS request message to the first network by using the first IMSI;
receiving a NAS response message comprising a cause value from the first network, after transmitting the first NAS request message;
not transmitting a second NAS request message to the first network by using the first IMSI, after receiving the NAS response message;
changing from the first IMSI to the second IMSI without removing the USIM;
accessing a second or the first network of the wireless communication system by using the second IMSI; and
transmitting a third NAS request message to the second or the first network by using the second IMSI according to the cause value;
wherein the first IMSI is changed to the second IMSI when an Elementary file is changed via data download or a universal SIM application toolkit (USAT) application, and a "REFRESH" command is issued by a universal integrated circuit card (UICC); and
a processing circuit, coupled to the storage unit, configured to execute the instructions stored in the storage unit.

14. The communication device of claim 13, wherein the step of transmitting the third NAS request message to the second or the first network by using the second IMSI according to the cause value comprises at least one of following steps:
transmitting the third NAS request message to a location area or a tracking area where the communication device receives the cause value, if the cause value is #12, #13 or #15;
transmitting the third NAS request message to a public land mobile network (PLMN) where the communication device receives the cause value, if the cause value is #11;
transmitting the third NAS request message for at least one Evolved Packet System (EPS) service or at least one General Packet Radio Service (GPRS) service, if the cause value is #7 or #14; and
transmitting the third NAS request message for at least one non-GPRS and/or non-EPS service or at least one GPRS and/or EPS service, if the cause value is #8.

15. The communication device of claim 13, wherein the first NAS request message or the second NAS request message comprises the first IMSI or a temporary identity of the first IMSI or is a NAS request message of the first IMSI, and the third NAS request message comprises the second IMSI or a temporary identity of the second IMSI or is a NAS request message of the second IMSI.

16. The communication device of claim 13, wherein the first NAS request message, the NAS response message, the second NAS request message or the third NAS request message is a mobility management (MM) message, an EPS MM (EMM) message or a GPRS MM (GMM) message.

17. The communication device of claim 13, further comprising:
performing a UICC reset procedure, a USIM application reset procedure or a third generation (3G) session reset procedure.

* * * * *